Nov. 21, 1950

H. GUTTON ET AL 2,530,694

DEVICE FOR GUIDING AND LANDING AIRCRAFT
BY MEANS OF DECIMETRIC RADIO WAVES

Filed July 18, 1946

Inventors
HENRI GUTTON &
JEAN JACQUES HUGON
By Haseltine, Lake & Co.
Attorneys

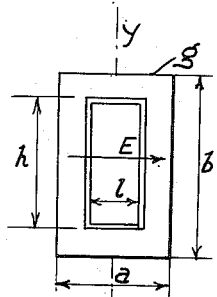
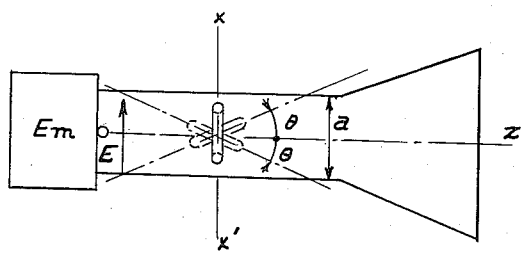
Fig. 4    Fig. 5
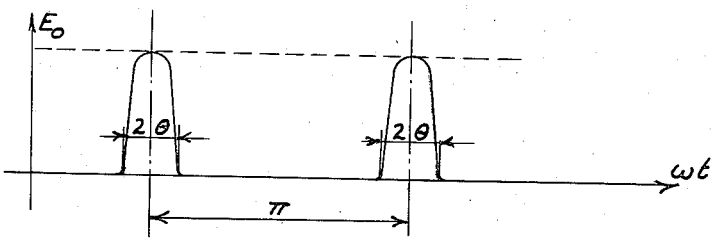
Fig. 6
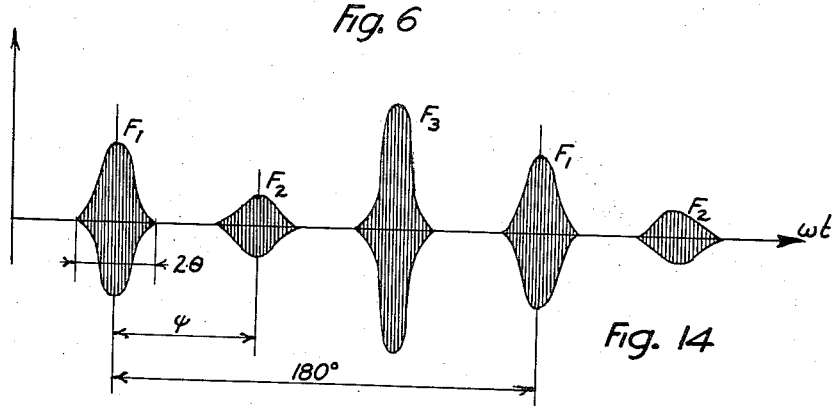
Fig. 14
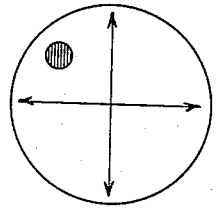 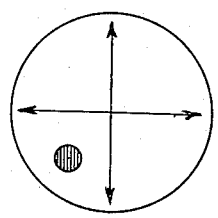 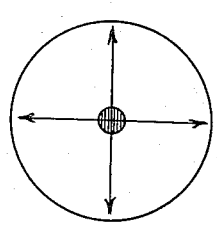
Fig. 15a    Fig. 15b    Fig. 15c Inventors
HENRI GUTTON +
JEAN JACQUES HUGON
By Haseltine, Lake & Co.
Attorneys Nov. 21, 1950 H. GUTTON ET AL 2,530,694
DEVICE FOR GUIDING AND LANDING AIRCRAFT
BY MEANS OF DECIMETRIC RADIO WAVES
Filed July 18, 1946 4 Sheets-Sheet 4
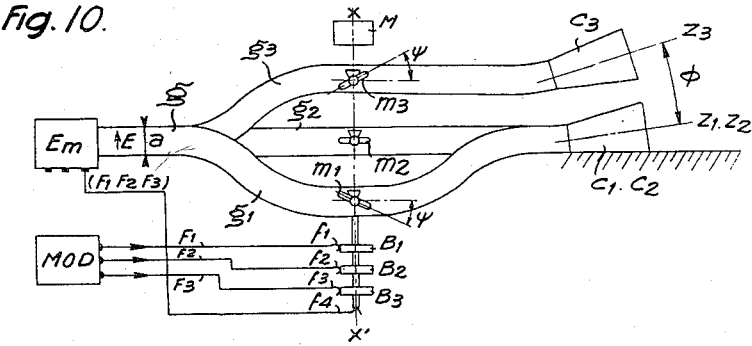
Fig. 10.
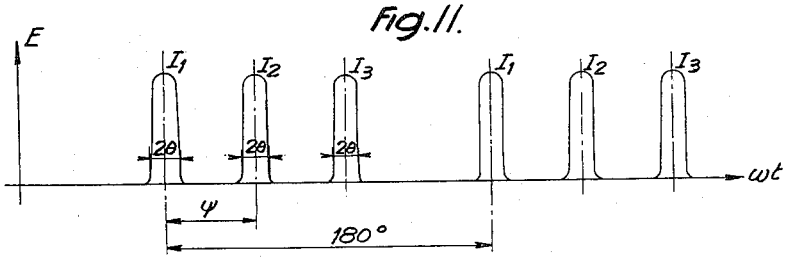
Fig. 11.
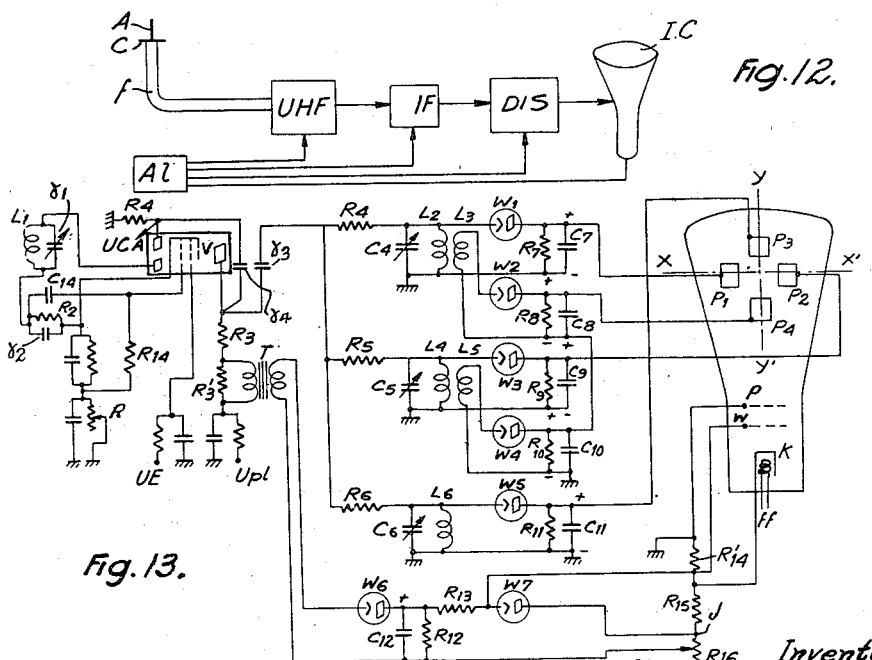
Fig. 12.
Fig. 13.
Inventors
HENRI GUTTON &
JEAN JACQUES HUGON
By Haseltine Lake & Co.
Attorneys Patented Nov. 21, 1950

2,530,694

UNITED STATES PATENT OFFICE 2,530,694

DEVICE FOR GUIDING AND LANDING AIRCRAFT BY MEANS OF DECIMETRIC RADIO WAVES

Henri Gutton and Jean Jacques Hugon, Paris, France, assignors to Compagnie Generale de Telegraphie Sans Fil, a corporation of France Application July 18, 1946, Serial No. 684,604
In France October 26, 1944

Section 1, Public Law 690, August 8, 1946
Patent expires October 26, 1964

9 Claims. (Cl. 343—108)

This invention is for improvements relating to devices for landing aircraft by means of decimetric radio waves.

It is known that a wave of the structure of $H_{01}$ may be propagated without deterioration in a guide of rectangular section provided that the dimension $b$, perpendicular to the electric field E (Figure 1) is greater than half the length of the propagation wave in the guide $$b > \frac{\lambda'0}{2}$$

The dimension $a$ can vary within somewhat wide limits without the structure of the wave changing. The electric field E, which is parallel to the smaller side $a$ of the guide, possesses no component along the direction of propagation $oz$ nor in a direction parallel to the larger side $b$ of the guide. Its distribution in amplitude is sinusoidal in the direction of the side $b$ whilst its value is zero at the extremities and a maximum at the central point of $b$. The guide is provided at its extremity with a horn having rectangular aperture of dimensions $a_1$, $b_1$, the angle of aperture of which is comparatively slight for the purpose of avoiding the effects of reflection of the energy. The distribution of the electric field in the aperture surface of the horn remains the same as in the guide, that is to say, that its variation of amplitude, represented on Figure 1 by the curve $mm'q$ in the direction of $b_1$ is sinusoidal having a maximum value on the horizontal symmetrical axis $XX'$. The radiation from such a horn is represented by the diagrams of Figures 2, 3a and 3b, where H represents the polar diagram of radiation in amplitude in the horizontal plane and V the polar diagram of radiation in the vertical plane. The aperture angles $\alpha$ and $\beta$ of these diagrams depend upon the dimensions $b_1$ and $a_1$ of the aperture of the horn, and decrease as these dimensions increase. In particular, $\beta$ is greater than $\alpha$ for $a_1$ is smaller than $b_1$. Thus, the distribution of the energy in the vertical plane and in the horizontal plane can be varied conveniently by varying the dimensions $a_1$ and $b_1$ of the aperture. Secondary radiations of slight amplitude are capable of appearing at the sides of the principal radiations but these can be eliminated by known methods.

It is also known that a total reflection of the energy circulating in a guide of rectangular section traversed by the wave $H_{01}$ may be obtained by means of a rectangular frame of dimensions $h$ and $l$ (Figure 4) forming a section of a parallel wire transmission line having its ends short circuited and arranged in such manner that its plane is located in the cross-section of the guide. The height $h$ of this frame must be such that the section of the line which it represents is tuned to the half wave length $\lambda_0$ in air. By rotating the frame about its horizontal axis (Figure 5) it will be found that the energy is propagated without reflection when the plane of the frame is perpendicular to the plane of the cross-section of the guide. The coefficient of reflection still remains negligible when the frame is rotated through an angle $\theta$, comparatively small (5 to 10 degrees) of each side of the axis $oz$. Beyond the angle $\theta$, the reflection increases and rapidly becomes a maximum, so that the curve of the electro-magnetic field at the outlet of the horn, has the shape indicated by Figure 6. Referring to Figure 6, E represents the value of the field in the absence of the frame or when the latter has its plane directed towards $oz$. There are obviously found, during a rotation of the frame by 360°, two wide zones each of $2\theta$, and spaced apart by 180°, for which there is transmission of energy.

The present invention relates to aerial radio guidance and concerns more particularly landing in the absence of visibility.

It has for an object an improved system of aircraft guidance, enabling a pilot to follow a landing line which is indicated to him by means of at least three beams of directed waves, transmitted by a fixed radio electric transmitter installed on the ground.

Another object of the invention is to prevent these directed waves from being reflected by the ground.

The invention has also for an object an arrangement enabling the transmission, successively and in accordance with a repetitive cycle, several beams of electromagnetic waves having the same carrier frequency and modulated by different signals.

It has furthermore for an object a receiver adapted to receive on board the aircraft the waves emitted by the above-mentioned transmitter, and to obtain therefrom the responsive signals and to transmit the latter in continuous voltages, in proportion to the intensity of said signals.

The invention also has for an object an arrangement utilizing the continuous voltages furnished by the receiver, for providing to the pilot a permanent visual indication, enabling him to take into account easily the eventual differences between his true position and the landing line which he is expected to follow.

These and other objects and advantages of the invention will be apparent from the following specification when taken with the accompanying drawings.

In the drawing,

Figure 4 shows for purpose of explanation a section of transmission line with two parallel conductors in the form of a rectangular plane placed in a right rection of a guide;

Figure 5 shows such a frame movable about an axis parallel to the electric field in the guide;

Figure 6 illustrates the intensity transmitted by the guide as a function of the angular position of the frame;

Figure 10 is a complete view of the transmitting part of the guiding and landing device of Figures 7–9;

Figure 11 is a diagram of the pulses emitted by the device of Figure 10;

Figure 12 is a block diagram of the receiving part of the guiding device according to the invention;

Figure 13 is a detailed schematic diagram of a part of the receiver; and

Figure 14 shows the form of pulses emitted in each channel of the transmitter;

Figures 15a, 15b, 15c show diagrammatically various views of the screen explaining the positions which the aircraft may take.

The transmitter device of the radio-landing system comprises essentially a generator of ultra-short waves $E_m$ (Figure 10), which may comprise for example a self-oscillating velocity modulation valve, mounted alone or in conjunction with a stage separator of the same type. This transmitter, the frequency of which is generally greater than 1,000 megacycles per second ($\lambda<30$ cm.), feeds into a guide $g$ which extends into three secondary guides $g_1$, $g_2$ and $g_3$ each terminating in a horn. In the interior of each of the guides $g_1$, $g_2$ and $g_3$, a frame is provided which is capable of rotation. The height of the frame is such that the tuning is effected on the frequency of the wave employed. The three frames $m_1$, $m_2$ and $m_3$ (Figure 10) are synchronously driven from the same shaft $xx'$ actuated by a driving motor M. The frames are set in such manner that their respective planes are disposed at an angle $\psi$ to one another. The angle $\psi$ is greater than the angle $2\theta$ of free transmission of the energy into the guides. There are mounted on the shaft $xx'$ which actuates the frames, three rings $B_1$, $B_2$, $B_3$ on which are arranged to bear three brushes $f_1$, $f_2$, $f_3$ connected to a modulator generator MOD of three modulation potentials strictly equal in amplitude and of which the frequencies $F_1$, $F_2$, $F_3$ are less than 20 kilocycles/sec. A fourth brush $f_4$ permits these potentials to be conveyed to the ultra-high frequency generator $E_m$ which is thus modulated by $F_1$ or $F_2$ or $F_3$ at a constant rate. The rings $B_1$, $B_2$ and $B_3$ comprise metallic and insulating sectors arranged in such manner that the transmitter $E_m$ is not modulated to the frequency $F_1$ except during the time of free transmission of energy into the guide $g_1$ and, similarly is only modulated to the frequency $F_2$ during the time of free transmission into the guide $g_2$ and to the frequency $F_3$ during the time of free transmission into the guide $G_3$.

Finally, when the frames rotate, the electromagnetic energy radiated by the horns $c_1$, $c_2$ and $c_3$ is presented in the form of groups of three impulses with rounded edges $I_1$, $I_2$ and $I_3$ such as are represented in Figure 11. The groups are displaced by 180° and the impulses displaced by an angle $\psi$ precisely equal to the angle between the frames $m_1$, $m_2$ and $m_3$. These impulses are modulated respectively at an equal rate, to the frequencies $F_1$, $F_2$ and $F_3$ and each employs, from the fact of their displacement in time, all the power which the transmitter can supply.

Figure 1:
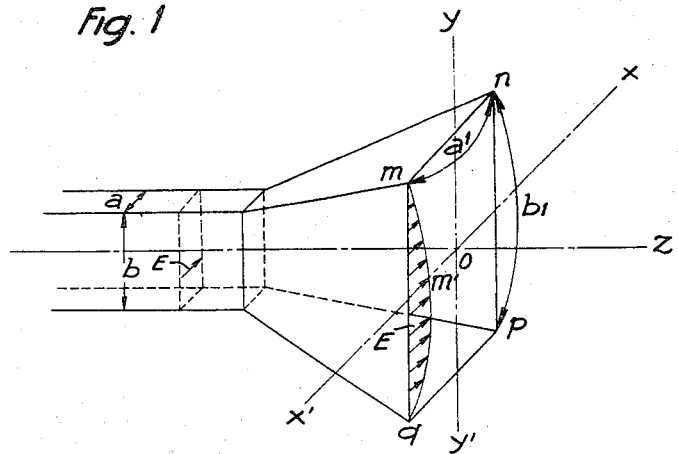
Figure 1 shows for the purpose of explanation an $H_{01}$ guide.
Figure 2:
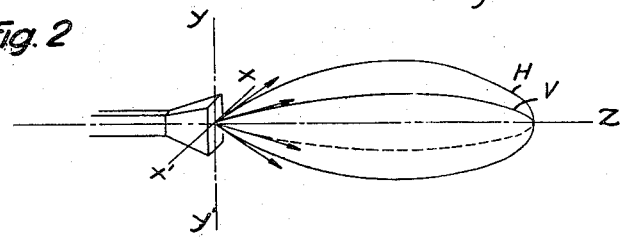
Figures 2 and 3a and 3b show for like purpose the diameter of lobe emission from a horn of such a guide.
Figure 3A:
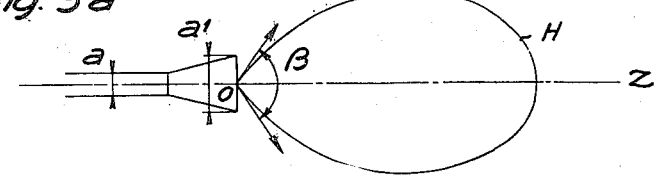
Figure 3B:
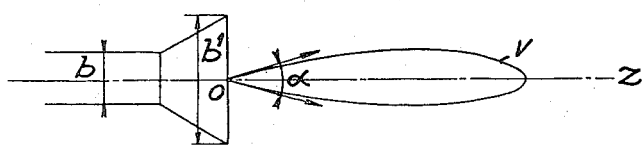
Figure 7:
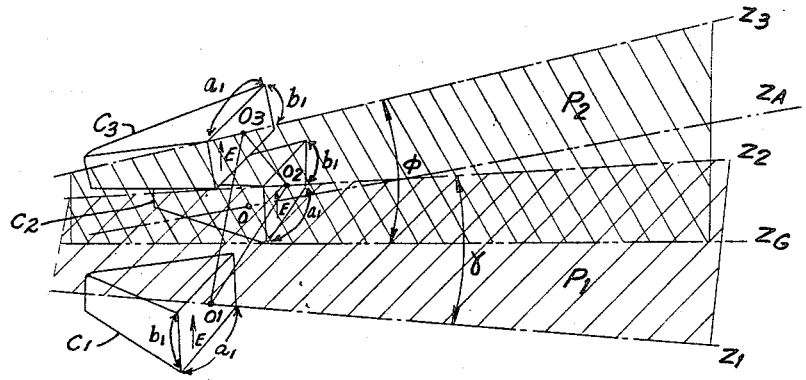
Figure 7 is a diagrammatic perspective view of one mode of realizing the invention comprising three electromagnetic transmitting horns arranged in accordance with an isosceles triangle with its base parallel to the ground.
Figure 8:
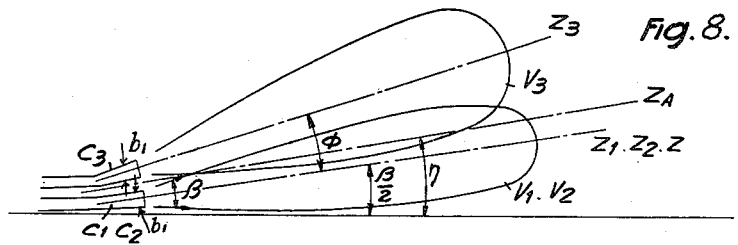
Figure 8 is a diagrammatic elevation of the apparatus of Figure 7 with the related directional patterns.
Figure 9:
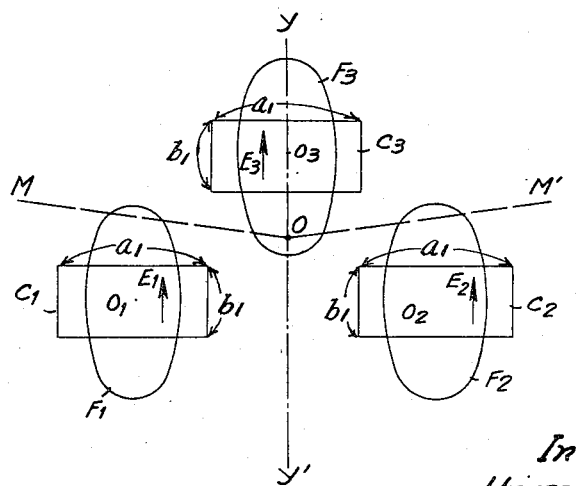
Figure 9 is a section through the apparatus of Figures 7 and 8 on a vertical plane at right angles to the guiding plane.

Before describing in detail the reception device, it will be shown how, according to the present invention, the directive projectors are arranged which define the line of landing. These projectors are three in number and are located in the manner indicated in Figures 7, 8 and 9. It will be seen from Figure 7 that the centres $O_1$, $O_2$, $O_3$ of the apertures of the horns are disposed in an isosceles triangle the base of which $O_1O_2$ is horizontal. The larger sides $b_1$ of the three horns are arranged parallel to the ground, whilst the electric field in the aperture is parallel to the smaller sides $a_1$ and has a polarization appreciably vertical from the fact of the slight inclination of the axes $O_1Z_1$, $O_2Z_2$ and $O_3Z_3$ with respect to the ground. The axes $O_1Z_1$ and $O_2Z_2$ of the horns $c_1$ and $c_2$ form an angle $\gamma$ in a plane ($O_1Z_1$, $O_2Z_2$) inclined to the horizontal plane at an angle $\beta/2$ (Figure 8) equal to one half the angle of aperture of the lobe defining the direction in the vertical plane. Thus, there are not produced annoying reflections from the ground. The horn $c_3$ located above the horns $c_1$, $c_2$ is arranged in such manner that its axis $O_3Z_3$ is in the vertical plane of landing $P_2$ the intersection of which with the plane ($O_1Z_1$, $O_2Z_2$) is $OZ_G$ which bisects the angle $\overline{z_2O_2}$, $\overline{O_1Z_1}$. The inclination $\phi$ of the axis $O_3Z_3$ of this horn with respect to the plane ($O_1Z_1$, $O_2Z_2$) is selected in such manner as to define a straight landing line $OZ_A$ inclined at an angle $\eta$ with respect to the ground and which is nothing more than the line of intersection of the plane $P_2$ with the surface or position of the points where the field $E_3$ due to the horn $c_3$ is equal to the sum $E_1+E_2$ of the fields presumed to be emitted simultaneously by the horns $c_1$ and $c_2$. Figure 9 represents a section through a plane perpendicular to the landing straight line of the hertzian space located in front of the projectors and illustrates at $c_1$, $c_2$, $c_3$ the three transmission projectors; at $F_1$, $F_2$, $F_3$ the position of the points where the fields $E_1$, $E_2$, $E_3$ are of equal value. Finally, there is illustrated at $\overline{MOM'}$ the section of the surface or the position of the points where the field $E_3$, due to $c_3$ is equal to the presumed sum $E_1+E_2$ of the fields due to $c_1$ and $c_2$. The intersection of the curve $\overline{MOM'}$ with the line $YOY'$ of the plane $P_2$ gives the point O of intersection of the straight landing line $OZ_A$ with the plane of the figure.

It is clear that if the receiver has an apparatus sensitive to the difference $E_1-E_2$ there will be observed a deviation of the measuring apparatus to the left or to the right according to whether the aircraft is to the left or to the right of the vertical plane $P_2$ the line of which is $YY'$ on the plane of Figure 19. In the same way if the receiver has another instrument sensitive to the difference $E_3-(E_1+E_2)$, there will be observed a deviation of this instrument upwards or downwards according to whether the aircraft is above or below the surface the line of which is $\overline{MOM'}$ on the plane perpendicular to the straight landing line. No deviation in the horizontal or vertical sense means that the aircraft is simultaneously in the left-hand surface, the line of which is $MOM'$, and in the plane $P_2$ of landing, that is at the intersection of these two surfaces and in consequence on the landing line.

The description will now be given of the receiving device installed on the aircraft according to the invention.

The series of elements constituting the receiving device are represented in Figure 12 and comprise: a wave collector A having a transmission feeder $f$, a receiver proper, a frequency discriminator DIS, a visual sensitive indicator IC of the cathode beam type and a feed box AL actuated by the current on the aircraft. The wave collector A is a ¼ wave aerial located under the fuselage of the aircraft and arranged so as to be vertical when the aircraft is flying level. It may be provided with a counterweight C when it does not extend directly from the fuselage. The collector A delivers to a feeder $f$ the characteristic impedance of which is adapted to its own radiation resistance. The receiver proper may be of super reaction or of frequency change and is of the same type as those serving on these same wave lengths, for radio communications. In the foregoing description the receiver is assumed to be for frequency change and in Figure 12 there is illustrated an ultra-high frequency mixer stage U. H. F. followed by an intermediate frequency amplifier I. F. having a sufficiently wide pass band, for example 1 to 2 megacycles/second in order to be able to include the accidental derivatives of the transmitters or of the local heterodyne. The control axis of the local heterodyne is provided with a brake in such manner that it can be keyed on after determining the beat, which is generally effected on the ground. The I. F. amplifier is connected to a practically linear detector, followed by an amplifier valve in the plate circuit of which there are found a collection of selector circuits which permit the discrimination of the signals and their rational employment according to the spirit of the invention. This collection of valves and circuits, indicated by DIS (Figure 12), is connected to a sensitive cathode indicator IC which acts as a visual member controlling the position of the aircraft with respect to the selected route or with respect to the line of landing. This cathode indicator, the principle of operation of which is the same as that of a cathode ray tube, comprises a hot cathode surmounted by a focusing system regulated so as to give a large luminous spot (for example of from 5 to 10 mm. in diameter) on a fluorescent screen. Four deflector plates $P_1$, $P_2$, $P_3$, and $P_4$, very elongated in the direction of the electronic beam, impart to this tube a great sensitiveness of deviation in two directions perpendicular both to each other and to the beam. A grid P controlling the density of electrons enables the brilliance to be regulated or even ensures the complete disappearance of the luminous spot. The arrangement of the discriminator is indicated in Figure 13 and comprises an amplifier detector vacuum tube V of the duodiode pentode type, one of the detector elements of which rectifies the impulsed potential which exists at the terminals of the secondary $L_1$, $\gamma_1$ of the last transformer of the intermediate frequency amplifier. The circuit $R_2$, $\gamma_2$, at the terminals of which the rectified potential appears, has a time constant sufficiently short to transmit without loss to the grid of the pentode element the highest of the three detected frequencies $F_1$, $F_2$ and $F_3$ whilst the connector condenser $C_{14}$ and the grid resistance $R_{14}$ are dimensioned so as to transmit only the oscillations of frequencies $F_1$, $F_2$ and $F_3$ and to block on the grid of the pentode element, arrest the rectified impulses of frequency equal to $2nN$, $n$ being the number of frames and N the number of rotations per second which they carry out in the guides. The amplified potentials are found on the resistances $R_3$ and $R'_3$ located in series in the plate circuit of the pentode element. They assume at corresponding time intervals the shape indicated in Figure 14 in which it is presumed that the reception collector is excited in an unequal manner by the fields $E_1$, $E_2$, $E_3$. These potentials are applied, through the condenser $\gamma_3$ and resistances $R_4$, $R_5$, $R_6$ to three self-inductance and capacity circuits having a high Q factor $L_2$—$C_4$—$L_4$—$C_5$, $L_6$—$C_6$, respectively tuned to the frequencies $F_1$, $F_2$, $F_3$. The coupling resistances $R_4$, $R_5$, $R_6$ large as compared with the impedance to the resonance of the tuned circuits, are dimensioned so that the potentials at the terminals of $L_2$—$C_4$, $L_4$—$C_5$ and $L_6$—$C_6$ are equal when the three potentials at the frequencies $F_1$, $F_2$, $F_3$ are equal in amplitude at the terminals of $R_3$, $R'_3$. The result is that impulses of equal amplitude in ultra-high frequency, modulated at an equal rate to the frequencies $F_1$, $F_2$ or $F_3$, received by the wave collector, are translated by impulses of equal amplitude at the frequencies $F_1$, $F_2$ or $F_3$ to the terminals of the tuned circuits $C_4L_2$, $C_5L_4$ or $C_6L_6$. These potentials, rectified by the detector elements $W_1$, $W_3$, $W_5$, give rise at the terminals of the circuits of high time constant (one second approximately): $R_7C_7$, $R_9C_9$, $R_{11}C_{11}$ to continuous potentials equal to the amplitude potentials of the impulses at the frequencies $F_1$, $F_2$ or $F_3$ which excite the tuned circuits. The circuits $R_7C_7$ and $R_9C_9$, which collect the rectified potentials due to the impulses from the direction horns $c_1$ and $c_2$, are connected to the horizontal deviation plates $P_1$, $P_2$ of the cathode indicator (Figure 13). The direction of connection is carried out in such manner as to make these plates positive with respect to earth; furthermore, the plate $P_1$ arranged to the left of an observer looking at the fluorescent screen is connected to the circuit which collects the continuous potential due to the impulses of the left-hand horn in the direction of landing, whilst the right-hand plate receives the rectified potential due to the impulses of the right-hand horn. It follows that there will be seen a displacement towards the left of the luminous spot when the aircraft is in the region located to the left of the plane of landing and for which the field due to the horn $c_1$ is larger than the field due to the horn $c_2$, whilst a displacement of the spot to the right is observed in the region located to the right of the plane of landing and for which the field of the right-hand horn $c_2$ is preponderant.

The deviator plates $P_3$, $P_4$ located on a vertical axis with respect to an observer placed in front of the fluorescent screen are employed together with $P_1$ and $P_2$ to guide the aircraft in the straight landing line. To this end, the deviator plate $P_3$ which deflects the cathode beam upwards, is supplied with the continuous potential which exists at the terminals of the high time constant circuit (about one-second) $R_{11}$, $C_{11}$ when the oscillating circuit $C_6L_6$ is the seat of low frequency currents due to a modulated impulse at the frequency $F_3$, that is to say, to an impulse emitted by the horn $c_3$, with which is equipped, in addition to $c_1$ and $c_2$, the radio-landing transmitter. The deflector plate $P_4$ is supplied with the continuous potentials, placed in series, which exist at the terminals of $R_8C_8$ and $R_{10}C_{10}$. These potentials come from the detection of the alternating potentials at the frequencies $F_1$ and $F_2$ which are induced in the coils $L_3$ and $L_5$ coupled to the coils $L_2$, $L_4$. The potential applied at $P_4$ is thus proportional to the sum of the two ultra-high frequency impulses $I_1$ and $I_2$ emitted non-simultaneously by the projectors $c_1$ and $c_2$ of the landing transmitter. The luminous spot will be deflected upwards or downwards as the aircraft is located above or below the surface of the field due to $c_3$ which is greater than the sum of the fields due to $c_1$ and $c_2$ presumed as transmitted simultaneously. Furthermore, the spot will be deflected to the right or to the left with respect to the vertical axis extending through the plates $P_3$ and $P_4$ when the aircraft is to the right or to the left of the vertical plane of landing, the line of which is YY' on the plane of Figure 9. Finally, the spot will be centred on the guide mark when the aircraft exactly follows the line of landing, the mark of which is represented by the point O (Figure 9), the intersection of the line MOM' of exact altitude and the line YY' of exact direction.

Figure 15 (a, b, c,) explains the operation of the device in radio-landing. According as to whether the aircraft is too high and too much to the left with respect to the landing line, or too low and too much to the left, or on the landing line, there will be produced the representations a, b or c of Figure 15.

To avoid erroneous interpretations in the zones of very feeble fields where there would be a risk of parasites being in excess, the mounting of the receiver is, according to the present invention, completed by a collection of circuits the role of which is to cause the spot of the cathode indicator to disappear when the strongest of the fields collected by the value of the aerial is below a certain limit. This object is attained by collecting, by means of a transformer T (Figure 13) shunted by a small resistance $R'_3$ a fraction of the potentials at the different frequencies of modulation which appear in the plate circuit of the pentode and by detecting these potentials by means of a rectifier $W_6$ inserted in the high time constant circuit $c_{12}R_{12}$. The continuous potential thus obtained and the amplitude of which is equal to that of the greatest of the potentials composed of the frequencies $F_1$, $F_2$, $F_3$ is applied in the positive direction to the Wehnelt cylinder $w$ of the cathode indicator through the intermediary of a resistance $R_{13}$ and of a rectifier $W_7$, the object of which is to restrict the potential of the grid to that at the point J, which is the junction of the resistances $R_{15}$ and $R_{16}$ and which correspond to the normal operation of the indicator. In the absence of fields or when these are too feeble, the positive potential which is added to the Wehnelt cylinder at the negative potential of extinction given by the movable arm of the potentiometer $R_{16}$ is not sufficient to cause the spot to reappear on the luminescent screen, and the pilot is thus warned that he is no longer in the zones of radio-guidance or of radio-landing.

What we claim is:

1. The method for radio-landing along a predetermined line of aircraft and the like, which comprises emitting a plurality of directional electromagnetic beams of ultra-short wave-lengths, namely two beams which define a vertical landing plane by the relation $E_1=E_2$ between the intensities of their fields and modulating said beams at different frequencies, and a third beam superimposed on said two beams defining a surface by the relation $E_3=E_2+E_1$ between the intensities of the field of the three beams, the said surface intersecting the said landing plane along the landing line and modulating said third beam at a third frequency differing from said first frequencies, using a single ultra-short carrier wave for emitting all three beams, producing said beams periodically and for short intervals of time in succession, applying to said carrier wave during said intervals the characteristic modulation frequency, selectively receiving the signals from said beams on the aircraft, and comparing according to the two above mentioned relations between $E_1$, $E_2$, $E_3$ the signals received in such manner as to direct the aircraft along said landing line.

2. A system of radio landing for airplanes along a predetermined line comprising, on the one hand, at the landing point, three aerials presenting a directive field diagram in the form of a beam, each of the aerials emitting successive trains of signals at ultra high frequency modulated by a characteristic low frequency, said aerials being arranged in a plane substantially vertical and at the vertices of an isosceles triangle whose base is parallel to the ground, the two aerials forming the said base being identical and oriented so that the axes of their field diagram form an angle of a few degrees between themselves and are equally inclined upwardly with reference to the ground, by an angle substantially equal to half the angle of opening of said diagrams, the third aerial being oriented so that the axis of the diagram is inclined upwardly a few degrees with respect to the axes of the diagrams of the said bottom aerials, in their plane of symmetry, an ultra short wave generator feeding said aerials, means inserted between the said generator and said aerials for chopping the wave produced by said generator into successive trains of signals, modulating them by said characteristic low frequencies and transmitting them alternatively to said aerials; and on the other hand, on board the airplane, means for receiving and detecting said signals and means for comparing them according to the two relations $E_1=E_2$ and $E_3=E_1+E_2$ between the fields $E_1E_2$ emitted by the bottom aerials of the triangle and $E_3$ emitted by the third aerial.

3. System of radio landing according to claim 2, wherein the successive trains of ultra high frequency signals are transmitted by three wave guides and three rectangular horns traversed by the same $H_{01}$ type of wave.

4. System of radio landing according to claim 2, wherein each guide comprises in its interior a frame constituted by a section of transmission line with parallel conductors having its extremities short circuited, movable about an axis parallel to the electric field of the wave which traverses the guide, said frame forming a rectangle having its sides parallel to the walls of said guide, the side perpendicular to the said field having a length such that the said frame is tuned to resonance on said wave, means for rotating the said frames while maintaining constant the angular distances between them, and means for feeding each frame by a characteristic low modulation frequency.

5. In a system of radio landing according to claim 2, a receiving arrangement on board the airplane comprising an aerial for receiving emitted signals, a mixer stage at ultra high frequency coupled to said aerial, an intermediate frequency amplifier coupled to said mixer, means for selecting the characteristic modulation frequencies of said signals, means for separating the said frequencies and for deriving potentials proportional to the fields $E_1$, $E_2$, $E_3$, a cathode ray oscillograph comprising a means producing a single cathode beam, devices for deflecting said beam in two perpendicular directions, means for applying the potentials at $E_1$ and $E_2$ to the horizontal deflection devices, means for applying the potential, proportional to $E_3$, to one of the vertical deflecting devices and a potential proportional to the sum $E_1+E_2$ to the other vertical deflection device.

6. In a system of radio landing according to claim 2, the receiving apparatus on board the airplane, comprising an aerial receiving emitted signals, a mixer stage at ultra high frequency coupled to said aerial, an intermediate frequency amplifier coupled to said mixer, a circuit of suitable time constant to select the characteristic modulation frequencies $F_1$, $F_2$, $F_3$, of said signals, an amplifier tube coupled to said circuit, three resonant circuits with high Q factor coupled in parallel to the anode of said tube and each tuned to one of said characteristic frequencies so as to separate the said frequencies of the tubes to derive potentials proportional to the fields $E_1$, $E_2$, $E_3$, three circuits with a large time constant, connected each to one of the three said resonant circuits, a cathode ray oscillograph comprising an emitting cathode, a control grid, a means producing a single cathode beam and two pairs of plates for deflecting said beam in two perpendicular directions, the horizontal deflecting plate being connected the one to the potential proportional to $E_1$, the other to the potential circuit proportional to $E_2$, the one of the vertical deflecting plates being connected to the potential circuit proportional to $E_3$ and the other to a supplementary circuit of large time constant, for adding the potential proportional to the field $E_1$ and $E_2$.

7. System for guiding an aircraft along a landing line comprising, in combination, a transmitter located on the ground comprising means for emitting successively and according to a repetitive cycle at least 3 directive beams of electromagnetic waves having the same carrier frequency and modulated by different signals, the said beams being oriented so as to produce overlapping radiation patterns and to maintain a certain predetermined relation between the intensities of the fields produced by the said beams along the said landing line, and a receiver on board the aircraft comprising means to receive said waves, to derive the respective signals and to compare the intensities of the latter so as to provide a visual indication of the eventual digressions between the true trajectory of the aircraft and the said landing line.

8. System for guiding an aircraft along a landing line comprising in combination, a transmitter located on the ground comprising means to emit successively and according to a repetitive cycle three directive beams of electromagnetic waves having the same carrier frequency and modulated by different signals, means enabling the orientation of the three beams so that their radiation patterns overlap and further, that two of said beams produce equal fields in the vertical plane containing the landing line, while the field produced by the third beam is equal at every point of said line to a combination predetermined by those fields produced by the other beams, and a receiver on board the aircraft comprising means to receive said waves, to derive the respective signals and to compare the intensities of the latter so as to provide a visual indication of the eventual digressions between the true trajectory of the aircraft and the said landing line.

9. System according to claim 8, wherein the said receiver comprises a cathode ray tube having a fluorescent screen, means to produce a luminous spot at the center of said screen, means to translate into two continuous voltages the difference between the derived signals received from the two first mentioned beams, on the one hand, and the aforesaid combination of those same signals with that derived from the third beam, on the other hand, and means to produce orthogonal deviations of the spot, respectively proportional to said continuous voltages.

HENRI GUTTON.
JEAN JACQUES HUGON.

REFERENCES CITED

The following references are of record in the file of this patent:

UNITED STATES PATENTS

| Number | Name | Date |
|---|---|---|
| 2,116,667 | Chireix | May 10, 1938 |
| 2,206,683 | Wolf | July 2, 1940 |
| 2,210,666 | Herzog | Aug. 6, 1940 |
| 2,241,897 | Alford | May 13, 1941 |
| 2,272,997 | Alford | Feb. 10, 1942 |
| 2,307,184 | Alford | Jan. 5, 1943 |
| 2,396,044 | Fox | Mar. 5, 1946 |
| 2,400,232 | Hall | May 14, 1946 |
| 2,408,425 | Jenks et al. | Oct. 1, 1946 |
| 2,414,791 | Barrow | Jan. 28, 1947 |
| 2,415,242 | Hershberger | Feb. 4, 1947 |
| 2,415,807 | Barrow et al. | Feb. 18, 1947 |
| 2,425,328 | Jenks et al. | Aug. 12, 1947 |
| 2,426,992 | Folland et al. | Sept. 9, 1947 |